US012799682B2

(12) United States Patent
Augustin et al.

(10) Patent No.: US 12,799,682 B2
(45) Date of Patent: Nov. 17, 2026

(54) UNDER SLEEPER PAD

(71) Applicant: Getzner Werkstoffe Holding GmbH, Bürs (AT)

(72) Inventors: Andreas Augustin, Nüziders (AT); Stefan Kopeinig, Dornbirn (AT); Harald Loy, Schruns (AT); Martin Quirchmair, Redlham (AT)

(73) Assignee: Getzner Werkstoffe Holding GmbH, Burs (AT)

( * ) Notice: Subject to any disclaimer, the term of this patent is extended or adjusted under 35 U.S.C. 154(b) by 575 days.

(21) Appl. No.: 18/462,536

(22) Filed: Sep. 7, 2023

(65) Prior Publication Data

US 2024/0084516 A1 Mar. 14, 2024

(30) Foreign Application Priority Data

Sep. 7, 2022 (AT) .................................. A 174/2022

(51) Int. Cl.
*E01B 3/44* (2006.01)
*B32B 27/06* (2006.01)
(Continued)

(52) U.S. Cl.
CPC ................ *E01B 3/44* (2013.01); *B32B 27/06* (2013.01); *B32B 27/40* (2013.01); *E01B 1/001* (2013.01); *B32B 2250/02* (2013.01); *B32B 2307/536* (2013.01); *B32B 2307/54* (2013.01); *B32B 2307/5825* (2013.01); *B32B 2307/72* (2013.01); *E01B 2204/01* (2013.01)

(58) Field of Classification Search
CPC ..... E01B 3/00; E01B 3/44; E01B 3/46; E01B 2204/01; E01B 1/001; B32B 27/06; B32B 27/40; B32B 2307/536; B32B 2307/54; B32B 2307/5825; B32B 2307/72
See application file for complete search history.

(56) References Cited

U.S. PATENT DOCUMENTS 4,652,495 A * 3/1987 Sato ........................ E01B 1/004
264/45.6
10,597,826 B2 * 3/2020 Augustin .................. E01B 3/46
(Continued)

FOREIGN PATENT DOCUMENTS

AU 2015348291 A1 * 7/2017 ............... E01B 3/46
CN 1663998 9/2005
(Continued)

OTHER PUBLICATIONS

Blobner Ulrich, Richter Bernhard "Expertise in testing methods for elastomers"; tensile test; Testing Basics and Recommendations for Practical Application; https://elastomerinstitut.de/wpcontent/uploads/sites/2/2022/09/FB_Zugversuch_Grundlagen-und-Praxis.pdf, p. 21, figure 14; p. 27, chart 7 and last paragraph, Oct. 2014; Accessed on the Internet on Jun. 23, 2023.

*Primary Examiner* — Cheng Lin
(74) *Attorney, Agent, or Firm* — Volpe Koenig

(57) ABSTRACT

An under sleeper pad (1) for fastening to an outer surface (2) facing a ballast bed (16), in particular an underside, of a railroad sleeper (3). The under sleeper pad (1) includes an elastomer layer (5), the elastomer layer (5) having a density in the range of 250 kg/m$^3$ to 350 kg/m$^3$, preferably 250 kg/m$^3$ to 330 kg/m$^3$.

14 Claims, 3 Drawing Sheets

(51) Int. Cl.
*B32B 27/40* (2006.01)
*E01B 1/00* (2006.01)

(56) References Cited

U.S. PATENT DOCUMENTS

| | | | | |
|---|---|---|---|---|
| 12,089,761 | B2 * | 9/2024 | Augustin | E01B 3/46 |
| 2010/0320281 | A1 * | 12/2010 | Potocan | E01B 3/46 238/29 |
| 2018/0127922 | A1 | 5/2018 | Augustin et al. | |

FOREIGN PATENT DOCUMENTS

| | | | | |
|---|---|---|---|---|
| DE | 102014116905 | | 5/2016 | |
| EP | 2697430 | | 6/2015 | |
| EP | 2531652 | B1 * | 11/2015 | E01B 2/00 |
| EP | 3221514 | | 12/2019 | |
| FR | 2511405 | A1 * | 2/1983 | E01B 19/003 |
| JP | 6431463 | B2 * | 11/2018 | |
| WO | WO-2012080406 | A1 * | 6/2012 | C08G 18/42 |
| WO | 2019157540 | | 8/2019 | |

* cited by examiner

UNDER SLEEPER PAD

CROSS-REFERENCE TO RELATED APPLICATIONS

This application claims priority from Austrian Patent Application No. A 174/2022, filed Sep. 7, 2022, which is incorporated herein by reference as if fully set forth.

TECHNICAL FIELD

The present invention relates to an under sleeper pad for fastening to an outer surface facing a ballast bed, in particular an underside, of a railroad sleeper, the under sleeper pad comprising an elastomer layer.

BACKGROUND

The railroad sleepers and rails that rest on the ballast of a ballast bed in rail transport undergo thermal fluctuations owing to the time of year and changing weather conditions. Especially in the railroad rail, these lead to high tensile loading which can be released suddenly and can lead to repositioning of the respective railroad sleeper in the form of track distortion. If and when such track distortions arise is determined by the friction and interlocking of the railroad rail in the ballast that counteract these distortions, this resistance being referred to as transverse displacement resistance. The transverse displacement resistance is determined mainly by the interaction between the corresponding outer side, in particular underside, of the railroad sleeper and the ballast.

Especially in the case of newly laid track, the transverse displacement resistance has low values, which can lead to an increased safety risk. The stability of the respective railroad sleeper in the ballast is limited owing to the small contact surface area between the underside of the railroad sleeper and the top layer of the ballast.

It is already prior art to increase the transverse displacement resistance by applying what are referred to as under sleeper pads to the outer surface, in particular underside, which faces the ballast bed, of the railroad sleeper.

In the prior art, numerous different embodiments of under sleeper pads are known. Reference can be made, for example, to EP 2 697 430 B1 as an example of an under sleeper pad of the type in question. The under sleeper pad usually comprises a fastening layer, which serves to fasten the under sleeper pad to the outer surface of the railroad sleeper. There are already a wide variety of solutions for this in the prior art, depending on the material of the railroad sleeper. Furthermore, the under sleeper pad also comprises an elastomer layer, which provides the under sleeper pad with corresponding elastic properties.

SUMMARY

It is an object of the invention to improve an under sleeper pad of the type mentioned above to the extent that it can provide particularly high transverse displacement resistance for railroad sleepers mounted on a ballast bed.

To achieve this object, the invention proposes that the elastomer layer has a density in the range of 250 kg/m$^3$ to 350 kg/m$^3$, preferably of 250 kg/m$^3$ to 330 kg/m$^3$.

It has surprisingly been found that an elastomer layer of the under sleeper pad with a density in the range of 250 kg/m$^3$ to 350 kg/m$^3$ and in particular of 250 kg/m$^3$ to 330 kg/m$^3$ enables particularly high transverse displacement resistance of the railroad sleeper on a ballast bed.

The elastomer layer may in principle consist of different elastomers, such as rubber or other types of natural rubber, granulated rubber, material blends, such as granulated stock of different base materials, etc. In particularly preferred exemplary embodiments of the invention, however, it is provided that the elastomer layer comprises or consists of a polyurethane.

Under sleeper pads according to the invention can be used with railroad sleepers of different materials. For example, the railroad sleeper may consist of concrete, metal, in particular steel, wood or a correspondingly hard plastic. Expediently, the under sleeper pad comprises a fastening layer for fastening to the railroad sleeper. The nature of the fastening layer by way of which the under sleeper pad is fastened to the outer surface, in particular to the underside, of the railroad sleeper can be adapted to the material of which the railroad sleeper consists. For example, in the case of a railroad sleeper of concrete, the fastening layer, as in EP 2 697 430 B1, may comprise a knitted spacer fabric or, in other embodiments, a random fiber layer, a nonwoven or a fibrous web, or have a completely different configuration. The under sleeper pad may also be adhesively bonded to the railroad sleeper. In that case, the fastening layer is therefore an adhesive layer. Here, all types of fastening layers known per se in the prior art can be used to form under sleeper pads according to the invention.

In order to give the elastomer layer sufficient strength, it is expediently provided that the elastomer layer has a tear resistance of 2.2 N/mm$^2$ (newtons per square millimeter) to 4.0 N/mm$^2$, preferably of 2.2 N/mm$^2$ to 2.8 N/mm$^2$. It is also expedient if the elastomer layer has an elongation at break of 50% to 200%, preferably of 50% to 75%. The tear resistance and the elongation at break can be determined in accordance with DIN EN ISO 527-1:2019-12 or DIN EN ISO 527-3:2019-02. In this respect, a test specimen according to type 5 of this standard with a thickness of 5 mm is preferably used. The tear resistance and elongation at break can be determined in one test operation but also in separate test operations.

In the event of determination of a compression set in accordance with DIN EN ISO 1856:2020-11, the elastomer layers of the under sleeper pads according to the invention expediently attain values of 15% to 24%, preferably of 17% to 24%. In the event of determination of the compression set of the elastomer layer in accordance with this standard, expediently method C (compression under specifically specified conditions) of the standard is used, during which storage at a temperature of 23+−2° C. and a relative air humidity of 50+−5% is performed for 72 hours and 25% deformation of the test specimen. In the event of determination of the compression set in this way, the sample geometry is expediently 25 mm×25 mm×12.5 mm.

In the sense of particularly good transverse displacement resistance, the Shore A hardness of the elastomer layer of the under sleeper pad is expediently in the range of 50 to 80, preferably of 70 to 80, it being possible to determine this Shore A hardness in accordance with DIN ISO 7619-1:2012-02.

In order to be able to attain particularly good transverse displacement resistance, the elastomer layer of the under sleeper pad should have certain plastic properties that make it possible for the ballast to penetrate the under sleeper pad or the elastomer layer and be held there in a form fit. However, the elastomer layer of the under sleeper pad should also confer a certain elasticity in order that the under sleeper pad can damp the vibrations created by a rail vehicle passing over as effectively as possible. The highly elastic properties required for the vibration protection are, however, not ideal in terms of the optimization of the track stability, since under sleeper pads with high elasticity generally do not permit, or permit only very little meshing of the ballast with the under sleeper pad. The stabilization of the ballast and subsequently the increase in the track stability is possible only to a limited extent.

Within this context, it is therefore necessary to obtain as good as possible a compromise between plastic and elastic properties of the under sleeper pad. Thus, on the one hand the under sleeper pad should, owing to its plastic properties, retain the ballast underneath the under sleeper pad and thus underneath the railroad sleeper as effectively as possible and ensure transverse displacement resistance which is as high as possible. On the other hand, however, the under sleeper pad should be designed from an elastic perspective such that it has sufficiently good vibration-damping properties. In summary, it would also be possible to refer to good elasto-plastic properties.

It has surprisingly been found that such elastoplastic properties are particularly good when the under sleeper pad has a relative residual deformation rv in the range of 50% to 80%, preferably of 55% to 70%, when a residual deformation test, outlined below, is performed. This residual deformation test was developed on the basis of EN 16730:2016 (E), section 5.3.6 and the "Fatigue test of USP on a concrete block with GBP (Annex 1)" mentioned in that section. The residual deformation test is to be performed on the under sleeper pad fastened to the outside of a test specimen carrier of concrete, and consists of the following test steps:

a) inserting the test specimen carrier of concrete with the under sleeper pad fastened thereto in a test apparatus, the test apparatus comprising a geometric test plate fastened to a pressure punch of a press, the geometric test plate comprising a pressing surface with elevations and depressions and the pressing surface of the geometric test plate being brought into contact with a surface of the under sleeper pad that faces away from the test specimen carrier,
b) measuring the starting thickness d0 of the under sleeper pad at a measurement location in the region of a maximum elevation of the geometric test plate,
c) pressing the pressing surface of the test plate into the under sleeper pad by means of the pressure punch in five hundred thousand pressing cycles following one another directly in succession, the test plate being pressed into the under sleeper pad with a pressure exhibiting a sinusoidal curve between 0.01 $N/mm^2$ and 0.15 $N/mm^2$ and at a cycle frequency of 15 Hz in each of these pressing cycles,
d) measuring a first modified thickness d1 of the under sleeper pad at the measurement location upon the five hundred thousandth pressing cycle, the under sleeper pad being in the maximally compressed state, which results during the five hundred thousandth pressing cycle, when the first modified thickness d1 is being measured,
e) lifting the test plate completely off of the under sleeper pad with a constant lifting-off speed of 1 mm/s starting directly after the first modified thickness d1 has been measured,
f) measuring a second modified thickness d2 of the under sleeper pad at the measurement location directly after a period of time of 60 s has elapsed, the period of time starting directly at the end of the measurement of the first modified thickness d1, and
g) calculating the relative residual deformation rv according to the formula rv=(d0−d2)/(d0−d1).

The test specimen carrier used may be for example a concrete test specimen with the dimensions 250 mm×250 mm×100 mm. The geometric test plate used may be for example a GBP according to Annex 1 of EN 16730:2016(E), which can also be referred to as geometric ballast plate. The cycle frequency of 15 Hz (Hertz) mentioned in test step c) means a cycle duration, that is to say a length of time of a pressing cycle lasts for one fifteenth of a second.

If the under sleeper pad has residual deformations rv in the regions mentioned when the residual deformation test is performed, it means that very high transverse displacement resistance is achieved for the railroad sleeper on the ballast bed by means of the corresponding elastoplastic properties of the under sleeper pad and in particular its elastomer layer. The plastic properties of the elastomer layer enable deep penetration of the ballast into the under sleeper pad together with an approximately constant high and virtually static stiffness. In addition, such under sleeper pads with corresponding plastic properties mesh with the top layer of the ballast to a superior extent, since the material of the elastomer layer closely follows the surface of the ballast stones in a form fit. The result is a form fit between the under sleeper pad and the ballast which remains until the next tamping cycle in the course of maintenance work on the ballast bed and is formed anew following corresponding tamping operations. In this case, tamping describes a routine maintenance activity in which the ballast is brought back underneath the railroad sleeper again or, in other words, is tamped. This meshing may for example be observed on the ballast stones which remain stuck in the underside of the under sleeper pad when the railroad sleeper with the under sleeper pad is raised off of the ballast. The consequence is a significant increase in the transverse displacement resistance compared to purely elastic under sleeper pads. Overall, the effect of this is a superior improvement in the positional stability of the track.

In order that the under sleeper pad achieves the desired properties by means of its elastomer layer, it can for example be provided, when the elastomer layer is being produced, in particular from polyurethane or a rubber elastomer, to react higher-functionality, preferably at least trifunctional, long-chain polymers with at least difunctional isocyanates. To achieve the desired stiffnesses, it is moreover possible to additionally generate hard phases in the elastomer layer by reacting short-chain bifunctional reaction partners, such as diols or diamines, with diisocyanates. They may be segmented polyurethane elastomers, that is to say products of an elastic soft phase with wide-mesh crosslinking and a stiff hard phase. Preferred reaction partners used here are glycols with terminal OH groups, such as butane-1.4-diol or ethane-1.2-diol, or corresponding diamines. The structure of the soft phase and of the hard phase can be selectively disrupted by the use of sterically hindered, short-chain reaction partners, such as glycols. The use of, for example, butane-1.3-diol causes the reactive OH groups to be shielded by the adjacent hydrocarbon radicals and this effect is enhanced further by reaction with the diisocyanate. Surprisingly, it was found that impeding the free rotatability of the CC bonds to which the reactive OH groups are bonded makes it possible to extremely strongly influence the damping behavior, for example by disrupting the phase separation. The replacement of 20% to 100% of the chain extender used as standard, such as butane-1,4-diol, with the butane-2,3-diol presented by way of example makes it possible to set the damping behavior to achieve the desired elastoplastic properties. As an alternative, preferably polyurea groups are generated by the use of diamines, which have a similar structure to diols. Corresponding control of the reaction using catalysts makes it possible, for example, to also implement more water used for the process of foaming a correspondingly foamed elastomer to form aromatic amines, with the result that the aliphatic hard-phase regions are supplemented by aromatic structures, this surprisingly also increasing the damping properties in addition to increasing the stiffness and thus influencing the desired elastoplastic effect to the extent that the desired embedding of the ballast increases and at the same time the transverse displacement resistance is markedly improved. This situation additionally stabilizes the railroad sleeper and thus the track in the ballast bed.

BRIEF DESCRIPTION OF THE DRAWINGS

Further features and characteristics of preferred embodiments of the invention are explained by way of example below in the description of the figures, in which.

DETAILED DESCRIPTION

Figure 1:
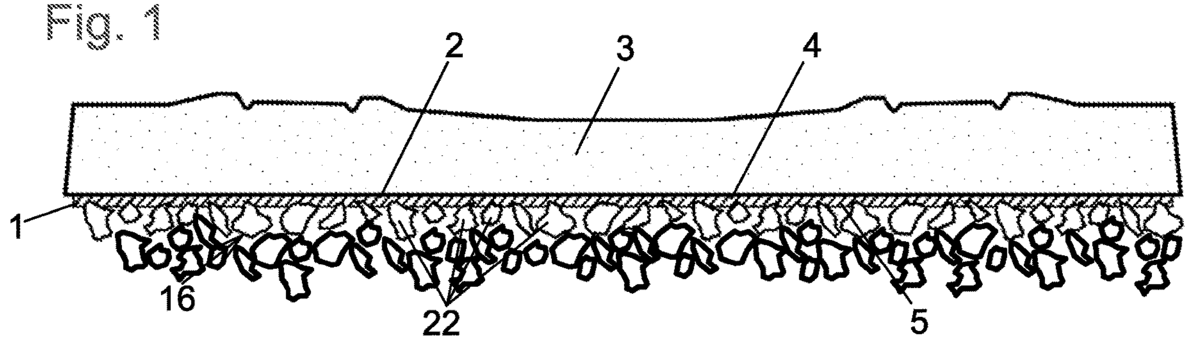
FIG. 1 shows a longitudinal view of a railroad sleeper according to the invention having an under sleeper pad mounted on a ballast bed.

FIG. 1 schematically shows a longitudinal view of a railroad sleeper 3 which rests on a ballast bed 16, formed from the ballast 22, with an interposed under sleeper pad 1 according to the invention. The under sleeper pad 1 is on the outer surface 2 facing the ballast bed 16, that is to say here the underside, of the railroad sleeper 3, and by means of its fastening layer 4 is fastened to the railroad sleeper 3. In addition to the fastening layer 4, the under sleeper pad 1 comprises the elastomer layer 5. Furthermore, the under sleeper pad 1 may also comprise further layers in a manner known per se, which do not need to be explained in more detail here.

Figure 2:
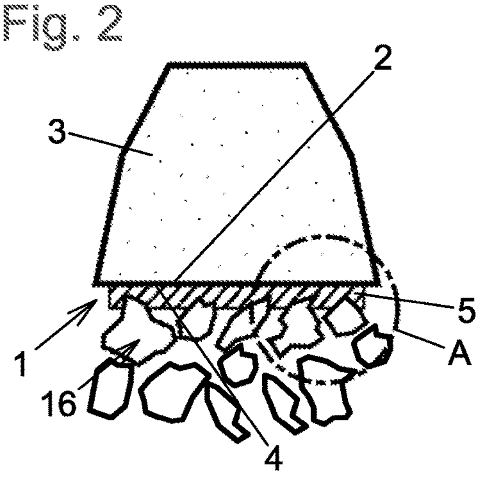
FIG. 2 shows a face-side view of the structure from FIG. 1.
Figure 3:
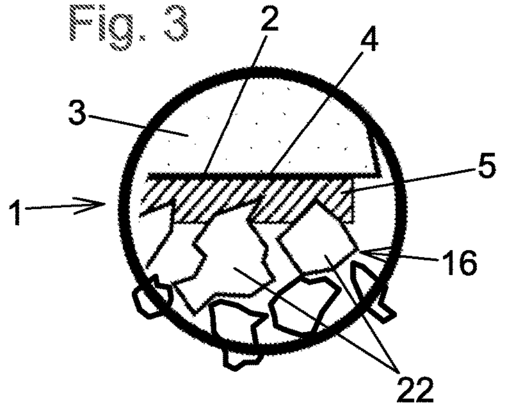
FIG. 3 shows an enlarged view of the detail in the region A from FIG. 2.

FIG. 2 shows a face-side view of the arrangement from FIG. 1. In the region A from FIG. 2, which is illustrated in an enlarged view in FIG. 3, it can be seen particularly clearly how the ballast 22 of the ballast bed 16 penetrates certain regions of the elastomer layer 5 and thus the under sleeper pad 1, in order as a result to increase the transverse displacement resistance, that is to say prevent to the greatest possible extent the railroad sleeper 3 from being displaced in its longitudinal direction with respect to the ballast bed 16 by corresponding stresses in the track system.

Figure 4:
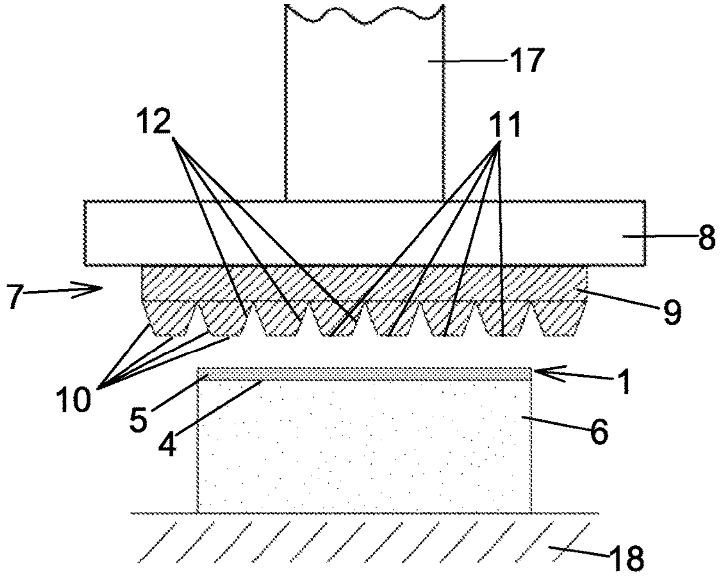
FIG. 4 shows an illustration of a test apparatus suitable for performing the residual deformation test.

FIG. 4 schematically shows a test apparatus 7 for performing the residual deformation test for determining the relative residual deformation rv of the under sleeper pad 1. The test apparatus 7 has a correspondingly stable and fixed base 18 and a pressure punch 8. The test plate 9 is fastened to the pressure punch 8. The test plate has a pressing surface 10 with elevations 11 and depressions 12. The pressure punch 8 is fastened to a press 17, which is illustrated only highly schematically here but is known per se and makes it possible to press the pressure punch 8 together with the test plate 9 into the under sleeper pad 1 and lift it out again. The press 17 may be for example a hydraulic press but may also be other presses that are known per se and are suitable for this application. In FIG. 4, a test specimen carrier 6 of concrete with the under sleeper pad 1 fastened thereto has already been inserted into this test apparatus 7, it being possible for the pressing surface 10 of the test plate 9 to be brought into contact with a surface of the under sleeper pad 1 that faces away from the test specimen carrier 6.

In FIGS. 5 to 10, which are described below, the pressure punch 8 and the press 17 are no longer illustrated but of course are present nevertheless.

Figure 5:
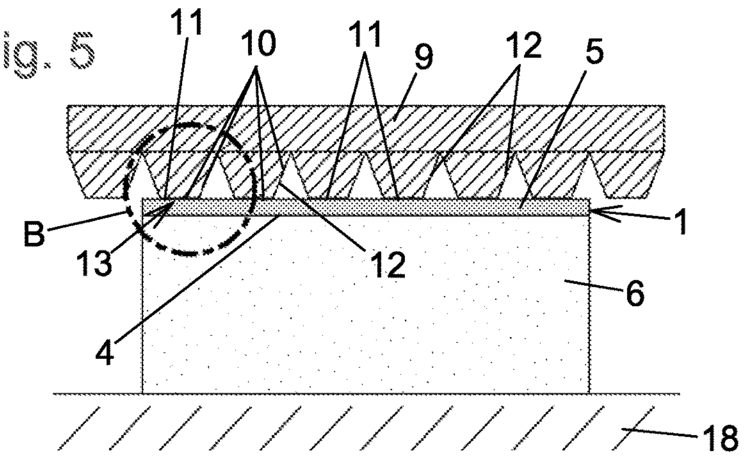
FIG. 5 to 12 show further illustrations for explaining the individual test steps of the residual deformation test.
Figure 6:
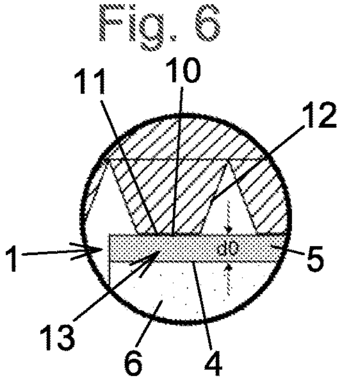
Figure 11:
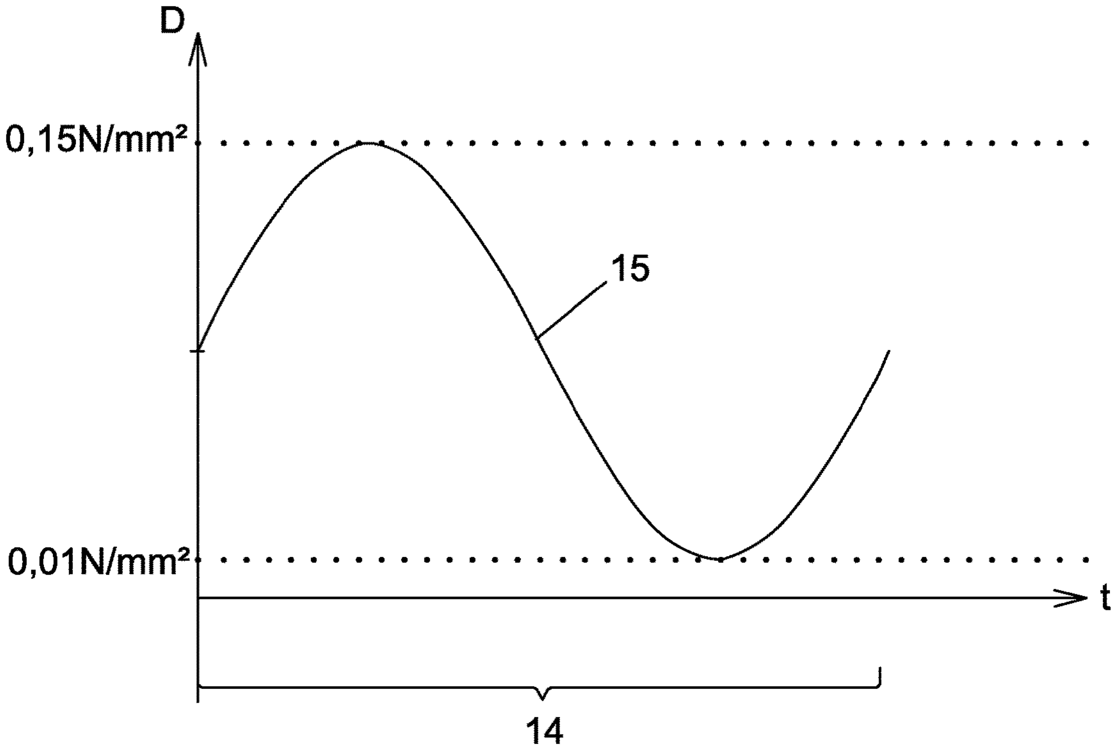

FIG. 5 shows the situation in which the pressing surface 10, with the elevations 11 and the depressions 12, of the test plate 9 is brought into contact with that surface of the under sleeper pad 1 that faces away from the test specimen carrier 6. In FIG. 5, and in particular in the detail B from FIG. 5 that is shown in FIG. 6, it can be seen that the under sleeper pad 1 here still has its starting thickness d0, which is measured at the measurement location 13 in the region of a maximum elevation 11 of the geometric plate 9. After this starting thickness d0 has been measured according to FIGS. 5 and 6, when the residual deformation test is performed, the pressing surface 10 of the test plate 9 is then pressed into the under sleeper pad 1 by means of the pressure punch 8 in five hundred thousand pressing cycles 14 following one another directly in succession, the test plate 9 being pressed into the under sleeper pad 1 with a pressure 15 exhibiting a sinusoidal curve between 0.01 $N/mm^2$ and 0.15 $N/mm^2$ and at a cycle frequency of 15 Hz in each of these pressing cycles 14. FIG. 11 shows such a pressing cycle 14. This illustrates the curve of the pressure 15 in this pressing cycle 14 in a diagram, which plots the pressure D against the time t. The cycle frequency of 15 Hz means that the duration of the cycle is one fifteenth of a second. In FIG. 11, the sinusoidal curve of the pressure 15 between 0.01 $N/mm^2$ and 0.15 $N/mm^2$ can be clearly seen. During the residual deformation test, five hundred thousand such pressing cycles 14 following one another directly in succession are performed.

Figure 7:
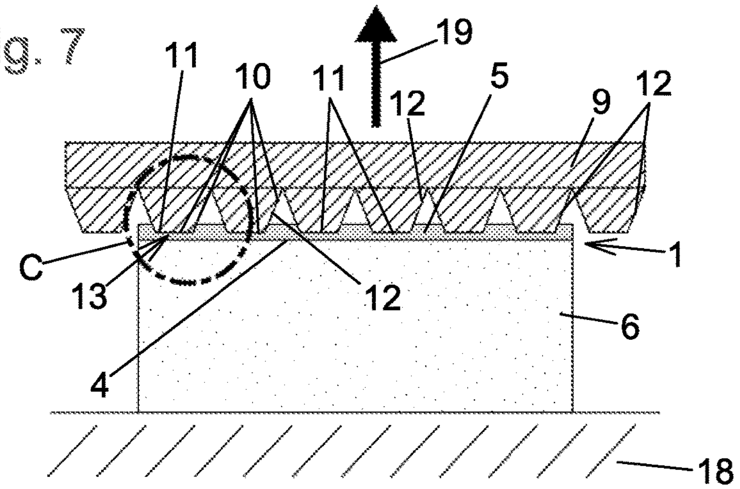
Figure 8:
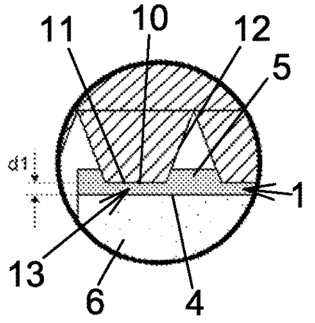
Figure 12:
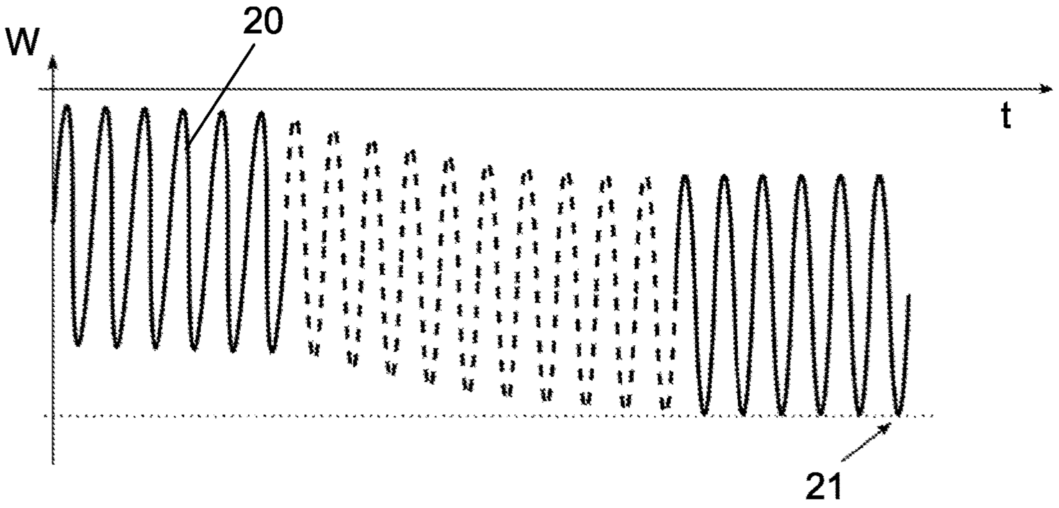

In a diagram which plots the travel 20 of the pressure punch 8 or of the test plate 9 that occurs along the axis W against the time t, FIG. 12 shows how the pressing surface 10 of the test plate 9 increasingly penetrates the under sleeper pad 1 at the measurement location 13 while the pressing cycles 14 are being performed. Here, of course not all five hundred thousand pressing cycles 14 are illustrated in FIG. 12, this being symbolized by the cycles illustrated in dashed line in the center. At the end of these five hundred thousand pressing cycles, the state 21 illustrated symbolically in FIG. 12 is reached in any case, and in this state the modified thickness d1 of the under sleeper pad 1 is determined at the measurement location 13. The measurement of the first modified thickness d1 is thus determined in the maximally compressed state 21 produced during the five hundred thousandth pressing cycle 14. FIG. 7 shows this state 21, in the case of which the pressing surface 10, by means of the elevation 11 of the test plate 9, has been pressed into the under sleeper pad 1 far enough that the latter retains only the thickness d1 at the measurement location 13. FIG. 8 shows an enlarged view of the region C from FIG. 7 and thus also the thickness d1 of the under sleeper pad 1 at the measurement location 13 at this point in time.

Figure 9:
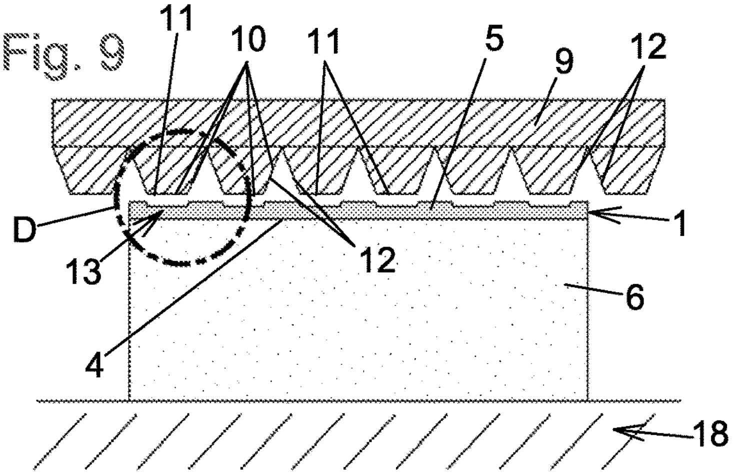
Figure 10:
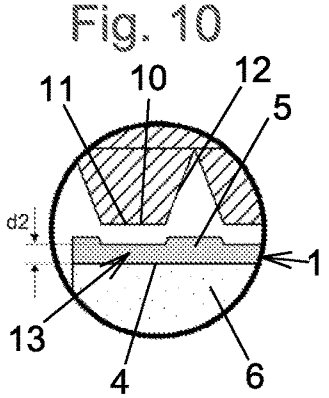

Directly after the measurement of the first modified thickness d1, the test plate 9 is completely lifted off of the under sleeper pad 1 with a constant lifting-off speed of 1 mm/s. The arrow 19 in FIG. 7 depicts the direction in which the test plate 9 is lifted off by means of the pressure punch 8 and the press 17 during this load-relieving operation, with the result that the state illustrated in FIG. 9 can be reached. FIG. 9 schematically illustrates that, after the five hundred thousand pressing cycles 14, the under sleeper pad 1 has a corresponding residual deformation which gradually resets over time. Directly a period of time of 60 seconds has expired, the second modified thickness d2, illustrated in FIG. 10 in an enlarged view of the detail D from FIG. 9, of the under sleeper pad 1 is measured at the measurement location 13. This period of time of 60 seconds starts directly at the end of the measurement of the first modified thickness d1.

The relative residual deformation rv can then be calculated from the thicknesses d0, d1 and d2 measured during the residual deformation test in the manner presented by means of the formula specified in test step g).

LIST OF REFERENCE SIGNS

1 Under sleeper pad
2 Outer surface
3 Railroad sleeper
4 Fastening layer
5 Elastomer layer
6 Test specimen carrier
7 Test apparatus
8 Pressure punch
9 Test plate
10 Pressing surface
11 Elevation
12 Depression
13 Measurement location
14 Pressing cycle
15 Pressure
16 Ballast bed
17 Press
18 Base
19 Direction
20 Travel
21 State
22 Ballast

The invention claimed is:

1. An under sleeper pad for fastening to an outer surface facing a ballast bed of a railroad sleeper, the under sleeper pad comprising:

an elastomer layer having a density in a range of 250 $kg/m^3$ to 350 $kg/m^3$;

wherein the under sleeper pad has a relative residual deformation rv in the range of 50% to 80%, for a residual deformation test performed on the under sleeper pad which is fastened on an outside of a test specimen carrier of concrete and includes the following test steps:

a) inserting the test specimen carrier of concrete with the under sleeper pad fastened thereto in a test apparatus, the test apparatus comprising a geometric test plate fastened to a pressure punch of a press, the geometric test plate comprising a pressing surface with elevations and depressions and the pressing surface of the geometric test plate being brought into contact with a surface of the under sleeper pad that faces away from the test specimen carrier, b) measuring a starting thickness do of the under sleeper pad at a measurement location in a region of a maximum one of the elevations of the geometric test plate, c) pressing the pressing surface of the test plate into the under sleeper pad by the pressure punch for five hundred thousand pressing cycles following one another directly in succession, the test plate being pressed into the under sleeper pad with a pressure exhibiting a sinusoidal curve between 0.01 $N/mm^2$ and 0.15 $N/mm^2$ and at a cycle frequency of 15 Hz in each of said pressing cycles, d) measuring a first modified thickness d1 of the under sleeper pad at the measurement location upon the five hundred thousandth pressing cycle, the under sleeper pad being in a maximally compressed state, which results during the five hundred thousandth pressing cycle, when the first modified thickness d1 is being measured, e) lifting the test plate completely off of the under sleeper pad with a constant lifting-off speed of 1 mm/s starting directly after the first modified thickness d1 has been measured, f) measuring a second modified thickness d2 of the under sleeper pad at the measurement location directly after a period of time of 60 s has elapsed, the period of time starting directly at an end of the measurement of the first modified thickness d1, and g) calculating the relative residual deformation rv according to the formula rv=(d0−d2)/(d0−d1).

2. The under sleeper pad as claimed in claim 1, wherein the elastomer layer comprises a polyurethane.

3. The under sleeper pad as claimed in claim 1, further comprising a fastening layer for fastening to the railroad sleeper.

4. The under sleeper pad as claimed in claim 1, wherein the elastomer layer has a tear resistance of 2.2 $N/mm^2$ to 4.0 $N/mm^2$.

5. The under sleeper pad as claimed in claim 1, wherein the elastomer layer has an elongation at break of 50% to 200%.

6. The under sleeper pad as claimed in claim 1, wherein the elastomer layer has a compression set of 15% to 24%.

7. The under sleeper pad as claimed claim 1, wherein the elastomer layer has a Shore A hardness of 50 to 80.

8. An under sleeper pad for fastening to an outer surface facing a ballast bed of a railroad sleeper, the under sleeper pad comprising:

an elastomer layer having a density in a range of 250 $kg/m^3$ to 350 $kg/m^3$;

wherein the elastomer layer has a compression set of greater than 15% to 24%, and the compression set is determined in accordance with method C of DIN EN ISO 1856:2020-11, during which storage at a temperature of 23+−2° C. and a relative air humidity of 50+−5% is performed for 72 hours and 25% deformation of the test specimen.

9. The under sleeper pad as claimed in claim 8, wherein the elastomer layer comprises a polyurethane.

10. The under sleeper pad as claimed in claim 8, further comprising a fastening layer for fastening to the railroad sleeper.

11. The under sleeper pad as claimed in claim 8, wherein the elastomer layer has a tear resistance of 2.2 $N/mm^2$ to 4.0 $N/mm^2$.

12. The under sleeper pad as claimed in claim 8, wherein the elastomer layer has an elongation at break of 50% to 200%.

13. The under sleeper pad as claimed claim 8, wherein the elastomer layer has a Shore A hardness of 50 to 80.

14. The under sleeper pad as claimed in claim 1, wherein the under sleeper pad has a relative residual deformation rv in the range of 50% to 80%, for a residual deformation test performed on the under sleeper pad which is fastened on an outside of a test specimen carrier of concrete and includes the following test steps:

a) inserting the test specimen carrier of concrete with the under sleeper pad fastened thereto in a test apparatus, the test apparatus comprising a geometric test plate fastened to a pressure punch of a press, the geometric test plate comprising a pressing surface with elevations and depressions and the pressing surface of the geometric test plate being brought into contact with a surface of the under sleeper pad that faces away from the test specimen carrier, b) measuring a starting thickness do of the under sleeper pad at a measurement location in a region of a maximum one of the elevations of the geometric test plate, c) pressing the pressing surface of the test plate into the under sleeper pad by the pressure punch for five hundred thousand pressing cycles following one another directly in succession, the test plate being pressed into the under sleeper pad with a pressure exhibiting a sinusoidal curve between 0.01 $N/mm^2$ and 0.15 $N/mm^2$ and at a cycle frequency of 15 Hz in each of said pressing cycles, d) measuring a first modified thickness d1 of the under sleeper pad at the measurement location upon the five hundred thousandth pressing cycle, the under sleeper pad being in a maximally compressed state, which results during the five hundred thousandth pressing cycle, when the first modified thickness d1 is being measured, e) lifting the test plate completely off of the under sleeper pad with a constant lifting-off speed of 1 mm/s starting directly after the first modified thickness d1 has been measured, f) measuring a second modified thickness d2 of the under sleeper pad at the measurement location directly after a period of time of 60 s has elapsed, the period of time starting directly at an end of the measurement of the first modified thickness d1, and g) calculating the relative residual deformation rv according to the formula $rv=(d0-d2)/(d0-d1)$.

* * * * *